(12) United States Patent
Cinpinski et al.

(10) Patent No.: US 7,938,101 B2
(45) Date of Patent: May 10, 2011

(54) ADAPTIVE CONTROL OF FUEL DELIVERY IN DIRECT INJECTION ENGINES

(75) Inventors: Kenneth J. Cinpinski, Ray, MI (US);
Donovan L. Dibble, Utica, MI (US);
Scot A. Douglas, Canton, MI (US);
Joseph R. Dulzo, Novi, MI (US);
Byungho Lee, Ann Arbor, MI (US)

(73) Assignee: GM Global Technology Operations LLC

( * ) Notice: Subject to any disclaimer, the term of this patent is extended or adjusted under 35 U.S.C. 154(b) by 75 days.

(21) Appl. No.: 12/369,245

(22) Filed: Feb. 11, 2009

(65) Prior Publication Data

US 2010/0199951 A1    Aug. 12, 2010

(51) Int. Cl.
*F02M 57/02* (2006.01)
*G01M 15/00* (2006.01)

(52) U.S. Cl. ............ 123/446; 701/103; 73/114.45; 73/114.51

(58) Field of Classification Search .......... 123/446, 123/447, 478, 480, 497; 73/114.41, 114.48, 73/114.49, 114.51; 701/103, 104, 114
See application file for complete search history.

(56) References Cited

U.S. PATENT DOCUMENTS

| | | | | |
|---|---|---|---|---|
| 4,438,496 A * | 3/1984 | Ohie | ............... | 701/104 |
| 5,020,362 A * | 6/1991 | Hart et al. | ............... | 73/114.43 |
| 5,445,019 A * | 8/1995 | Glidewell et al. | ............... | 73/114.51 |
| 5,535,621 A * | 7/1996 | Glidewell et al. | ............... | 73/114.49 |
| 5,616,837 A * | 4/1997 | Leonard et al. | ............... | 73/114.43 |
| 5,708,202 A * | 1/1998 | Augustin et al. | ............... | 73/114.43 |
| 5,974,865 A * | 11/1999 | Dambach | ............... | 73/49.7 |
| 6,085,727 A * | 7/2000 | Nakano | ............... | 123/447 |
| 6,314,947 B1* | 11/2001 | Roche | ............... | 123/525 |
| 6,345,606 B1* | 2/2002 | Ricci-Ottati et al. | ............... | 123/456 |
| 6,349,702 B1* | 2/2002 | Nishiyama | ............... | 123/456 |
| 6,497,223 B1* | 12/2002 | Tuken et al. | ............... | 123/497 |
| 6,647,769 B1* | 11/2003 | Fujino et al. | ............... | 73/114.41 |
| 6,694,953 B2* | 2/2004 | Barnes et al. | ............... | 123/500 |
| 6,732,715 B2* | 5/2004 | Fallahi et al. | ............... | 123/480 |
| 6,786,201 B2* | 9/2004 | Ohtani | ............... | 123/431 |
| 6,792,917 B2* | 9/2004 | Kohketsu et al. | ............... | 123/446 |
| 6,823,834 B2* | 11/2004 | Benson et al. | ............... | 123/299 |
| 6,910,464 B2* | 6/2005 | Ishikawa et al. | ............... | 123/458 |
| 6,951,206 B2* | 10/2005 | Kishimoto | ............... | 123/497 |
| 6,971,368 B2* | 12/2005 | Uchiyama | ............... | 123/359 |
| 7,080,550 B1* | 7/2006 | Goris et al. | ............... | 73/114.48 |
| 7,219,005 B2* | 5/2007 | Mazet | ............... | 701/104 |
| 7,267,106 B2* | 9/2007 | Adachi et al. | ............... | 123/436 |
| 7,523,743 B1* | 4/2009 | Geveci et al. | ............... | 123/486 |
| 7,552,717 B2* | 6/2009 | Dingle | ............... | 123/480 |
| 7,558,665 B1* | 7/2009 | Geveci et al. | ............... | 701/104 |
| 7,650,779 B2* | 1/2010 | Puckett et al. | ............... | 73/114.41 |
| 7,717,088 B2* | 5/2010 | Thomas | ............... | 123/478 |
| 2009/0084348 A1* | 4/2009 | Batenburg et al. | ............... | 123/294 |
| 2009/0164094 A1* | 6/2009 | Geveci et al. | ............... | 701/103 |
| 2009/0164095 A1* | 6/2009 | Geveci et al. | ............... | 701/103 |
| 2010/0147058 A1* | 6/2010 | Cinpinski et al. | ............... | 73/114.51 |

* cited by examiner

*Primary Examiner* — Thomas N Moulis

(57) ABSTRACT

An adaptive fuel delivery control system includes a pressure monitoring module and a flow rate determination module. The pressure monitoring module determines an actual pressure drop after a fuel injection event on an injector. The flow rate determination module determines an adjusted flow rate based on a reference flow rate and the pressure drop.

20 Claims, 3 Drawing Sheets

ADAPTIVE CONTROL OF FUEL DELIVERY IN DIRECT INJECTION ENGINES

FIELD

The present disclosure relates to direct injection engines, and more particularly to adaptive control of fuel delivery in direct injection engines.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

Fuel injection quantities delivered to an engine are controlled to meet fuel economy requirements and emission standards. The fuel quantity that passes through a fuel injector is determined based on duration of fuel injection (i.e., duration when the fuel injector is energized) given a rail pressure and a flow rate. The rail pressure is determined based on a pressure reading from a pressure sensor when the fuel injection starts. The flow rate is predetermined based on a size of the fuel injectors. The flow rate is assumed to be the same for all injectors along a fuel rail and remains constant during life of fuel injectors.

The fuel injectors along the fuel rail may not deliver the same fuel quantity at the same rail pressure for the same duration of fuel injection. Manufacturing tolerances may lead to differing flow rates across the injectors. Moreover, the actual flow rate may deviate from the predetermined flow rate due to injector coking. "Injector coking" refers to buildup of deposits on the orifice of the injector and is a result of exposing the orifices of the injectors to the high heat of the combustion chamber. Injector coking causes restricted fuel flow and changes the fuel flow rate through the injectors. The fuel flow rate may be constantly changed during life of injectors and may not be changed in the same manner across all of the injectors. As a result, fueling control of the engine may be adversely affected.

SUMMARY

An adaptive fuel delivery control system according to the present disclosure includes a pressure monitoring module and a flow rate determination module. The pressure monitoring module determines an actual pressure drop after a fuel injection event on an injector. The flow rate determination module determines an adjusted flow rate based on a reference flow rate and the pressure drop.

In other features, the reference flow rate is determined based on a physical model that simulates performance of a fuel rail. The physical model includes correlations between reference pressure drops and reference fuel quantities. The flow rate determination module determines a correction factor based on the actual pressure drop, the reference pressure drop and duration of the fuel injection event.

A method of adaptively controlling fuel delivery according to the present disclosure includes determining an actual pressure drop after a fuel injection event and determining an adjusted flow rate based on a reference flow rate and the actual pressure drop.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
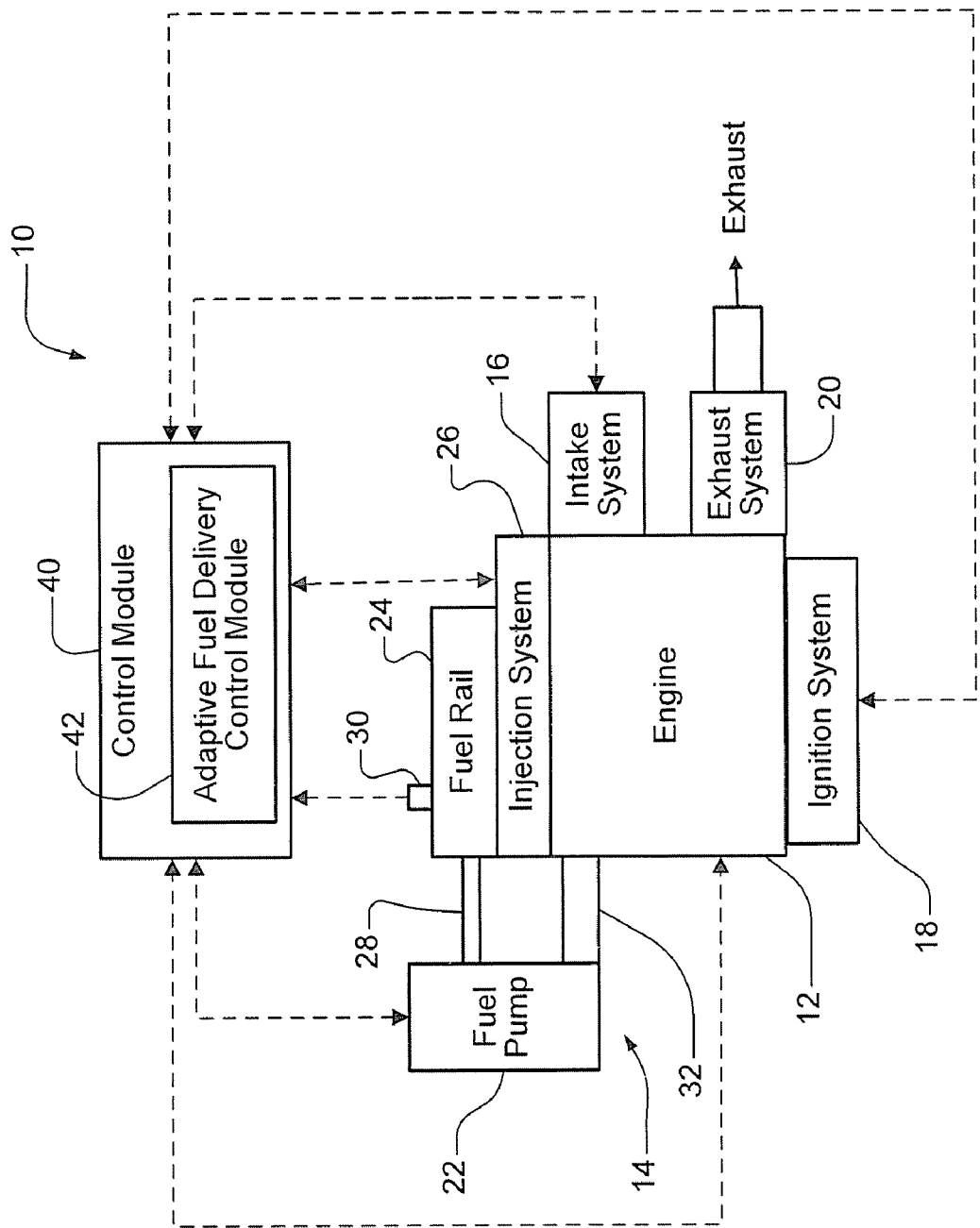
FIG. 1 is a functional block diagram of an engine system that includes an adaptive fuel delivery control module according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

The adaptive fuel delivery control system in accordance with teachings of the present disclosure determines a correction factor based on duration of fuel injection and a difference between an actual fuel quantity and a reference fuel quantity during the fuel injection. The actual fuel quantity is determined based on a pressure drop after the fuel injection. The adaptive fuel delivery control system determines an adjusted flow rate based on a reference flow rate and the correction factor.

Referring to FIG. 1, an engine system 10 in accordance with teachings of the present disclosure includes an engine 12, a fuel system 14, an intake system 16, an ignition system 18, and an exhaust system 20. The fuel system 14 may provide fuel to the engine 12. The engine system 10 is a direct injection system where fuel is injected directly into the compressed air in the combustion chamber and at a high pressure. The intake system 16 provides air to the engine 12. The ignition system 18 provides a spark to ignite the fuel and air mixture in a combustion chamber of the engine 12. Combustion of the air-fuel mixture in the engine 12 provides power that is transferred to a transmission (not shown) and concurrently produces exhaust. The exhaust exits the engine 12 through the exhaust system 20.

The fuel system 14 includes a high pressure fuel pump 22, a fuel rail 24, an injection system 26, a fuel line 28, and a pressure sensor 30. The fuel pump 22 may be a piston pump that provides high pressure fuel to the fuel rail 24 through a fuel line 28. An engine crankshaft (not shown) drives the fuel pump 22 through a camshaft mechanism 32. The fuel pump 22 controls a fuel mass quantity that flows to the fuel rail 24 by adjusting the fuel mass quantity that is trapped within a piston cylinder of the fuel pump.

The fuel pump 22 delivers fuel under pressure through the fuel line 28 to the fuel rail 24. The fuel rail 24 delivers high pressure fuel to the injection system 26 at the direct injection inputs of the engine 12. The pressure sensor 30 is provided at the fuel rail 24 to monitor the rail pressure. Excess fuel at the fuel rail 24 may be returned to a fuel tank (not shown) through a fuel return line (not shown). The fuel return line may contain a pressure regulator (not shown). The injection system 26 includes a plurality of injectors (not shown) that communicate with the fuel rail 24 and that provide fuel sequentially and directly to engine combustion chambers.

A control module 40 communicates with the engine 12, the fuel pump 22, the fuel rail 24, the injection system 26, the intake system 16, the ignition system 18, and the pressure sensor 30. The control module 40 includes an adaptive fuel delivery control module 42 that controls delivery of fuel into a combustion chamber of the engine 12.

Figure 2:
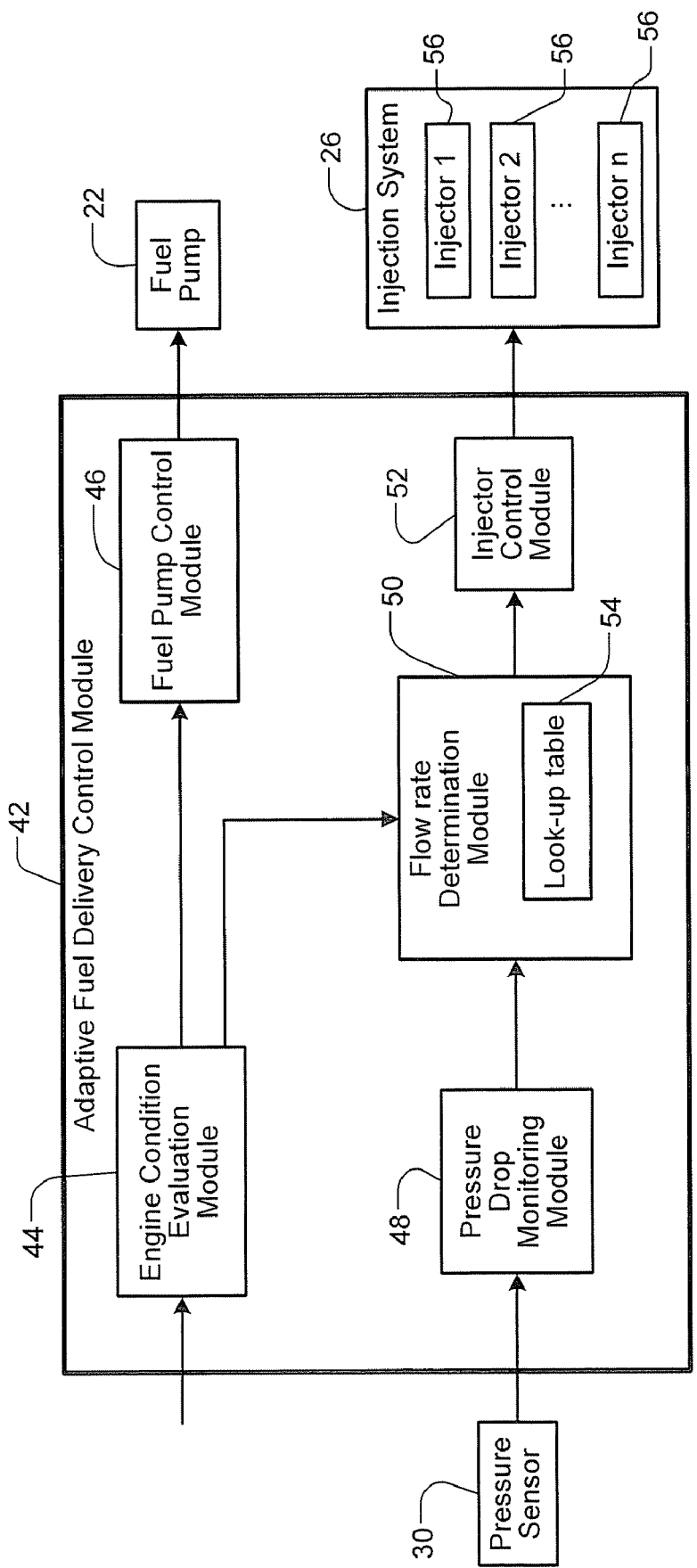
FIG. 2 is a functional block diagram of an adaptive fuel delivery control module according to the present disclosure.

Referring to FIG. 2, the adaptive fuel delivery control module 42 includes an engine condition evaluation module 44, a fuel pump control module 46, a pressure monitoring module 48, a flow rate determination module 50, and an injection control module 52. The engine condition evaluation module 44 monitors the engine operating conditions and determines whether enabling conditions are met for adaptively learning a flow rate. The fuel pump control module 46 controls the fuel pump 22. The pressure monitoring module 48 receives pressure data from the pressure sensor 30. The flow rate determination module 50 adaptively learns a flow rate for each injector based on actual fuel injection conditions. The injector control module 52 controls fuel injection timing and duration of the plurality of injectors 56.

More specifically, the enabling conditions for the learning process are present when fuel rail pressure is above a first threshold, when engine speed (RPM) is below a second threshold, and when a fuel demand is above a third threshold. The enabling conditions ensure that more accurate pressure measurements can be obtained.

Generally, the fuel rail pressure for a direct injection engine may be between approximately 6 MPa (870 psi) and approximately 20 MPa (2900 psi) when the engine is running. Therefore, when the direct injection engine 12 is running, the rail pressure is generally above the first threshold. Under the high rail pressure, pressure fluctuations following the fuel injection event are relatively small and thus have less effect on accurate measurement of the rail pressure.

When the engine 12 runs at low RPMs, for example only, below 2000 RPM, the pressure oscillations have less influence on the accurate measurement of the fuel rail pressure due to the fuel rail 24 having more time to damp out the pressure oscillations. Further, when the engine 12 demands more fuel above a third threshold, more fuel flows through the fuel injector after an injection event, resulting in a higher pressure drop in the fuel rail. Therefore, the pressure fluctuations have less effect on the accurate determination of the pressure drop.

For example only, the enabling conditions may be present when a driver increases the throttle (i.e., "tip-in") from a stopped condition or during a wide-open throttle acceleration. During a throttle tip-in, the engine speed is approximately 600 RPM and the fuel demand is approximately four times what is required during a steady state at the same RPM.

When the enabling conditions are present, the fuel pump control module 46 is commanded to disable the fuel pump 22 and the flow rate determination module 50 is activated to adaptively learn the flow rate.

During normal engine operation, the fuel pump control module 46 commands the fuel pump 22 to deliver a requested amount of fuel to the fuel rail 24. The injector control module 52 energizes the plurality of injectors 56 to inject fuel sequentially according to a requested timing and pulse width. During the learning process, the fuel pump control module 46 disables the fuel pump 22 and no fuel is delivered to the fuel rail 24. As such, the fuel rail 24 may reach a steady state prior to an injection event on a specific injector. Maintaining the fuel rail 24 close to a steady state minimizes pressure fluctuations to ensure accurate measurement of the rail pressure.

The pressure monitoring module 48 receives pressure readings (i.e., first pressure and second pressure) from the pressure sensor 30 before and after an injection event on a specific injector. The pressure monitoring module 48 determines an actual pressure drop based on the first pressure and the second pressure. The pressure monitoring module 48 sends a signal to the flow rate determination module 50 indicating the actual pressure drop.

The flow rate determination module 50 includes a look-up table 54 that includes correlations between a pressure drop and a fuel quantity at different first rail pressures immediately before a fuel injection event. The correlations are obtained based on a physical model. The physical model includes mathematical equations that characterize or simulate operation or performance of the fuel rail based on the law of physics, commonly with the aid of a computer. The physical model represents the desired performance of the fuel rail. The data obtained by the physical model represents the desired parameters for a fuel rail without complicated testing.

The actual pressure drop is compared with the reference pressure drop. If the actual pressure drop deviates from the reference pressure drop and exceeds a threshold percentage of the reference pressure drop, correction to the flow rate may be performed. The flow rate determination module 50 determines an actual quantity of fuel that flows through the specific injector based on the first rail pressure, the actual pressure drop, and the look-up table 54. The reference fuel quantity is determined based on a reference fuel flow rate and duration of the fuel injection. The reference fuel flow is predetermined based on size of the fuel injector (fuel flow capacity) and the first rail pressure measured immediately before the fuel injection.

The flow rate determination module 50 determines a correction factor based on the difference between the actual fuel quantity and the reference fuel quantity and the pulse width of a pulse width signal that energizes the fuel injector (i.e., duration of the fuel injection). The flow rate determination module 50 determines a learned or adjusted flow rate based on a reference flow rate and the correction factor. When the actual pressure drop is larger than the reference pressure drop, the fuel injector delivers more fuel than required. The adjusted flow rate is the sum of the reference flow rate plus the correction factor. When the actual pressure drop is lower than the reference pressure drop, less fuel than required is delivered through the fuel injector. The adjusted flow rate is equal to the reference flow rate minus the correction factor.

Alternatively, the correction factor may be determined based on a predetermined number (for example only, 10) of fuel injection events on a specific injector. The averaged fuel quantity for one injection event may be determined based on the accumulative pressure drop. The correction factor may be determined based on an averaged fuel quantity and the reference fuel quantity.

After the adjusted flow rate for the specific injector is determined, the adaptive fuel delivery control module 42 may continue to determine a learned flow rate for the remaining injectors if the enabling conditions are still present. If the enabling conditions are no longer present, the learning process can be scheduled at a later time for a next or remaining injector(s). The pump control module 46 enables the fuel pump 22 to resume supply of high pressure fuel to the fuel rail 24. The injector control module 52 energizes the plurality of injectors 56 for duration based on the adjusted flow rate, if available. The adaptive learning process may be scheduled regularly to ensure that the adjusted flow rate reflects the actual flow conditions of the injectors.

Figure 3:
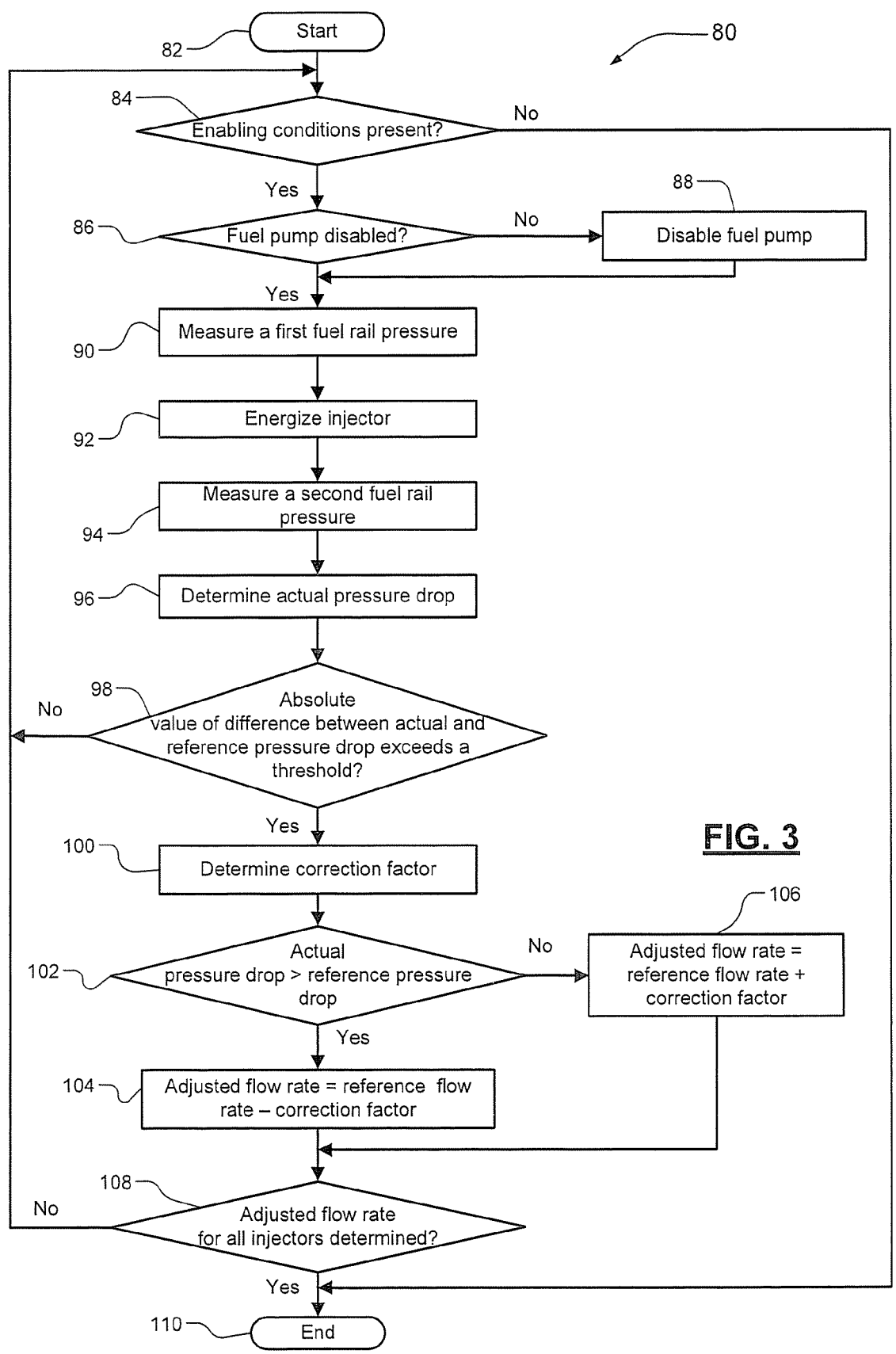
FIG. 3 is a flow diagram of a method of adaptively controlling fuel delivery according to the present disclosure.

Referring to FIG. 3, a method 80 of adaptively controlling fuel delivery starts in step 82. The engine condition evaluation module 44 determines whether enabling conditions are present in step 84. If the enabling conditions are not present, the method 80 goes to step 110 and ends. If present, the adaptive fuel delivery control module 42 determines whether the high pressure fuel pump 22 is disabled in step 86. If the fuel pump 22 is not disabled, the fuel pump control module 46 disables the fuel pump 22 in step 88. The pressure sensor 30 measures a first rail pressure in step 90. The fuel injector control module 52 energizes an injector in step 92 to inject a desired (or reference) fuel quantity into an associated cylinder. After the injection event, the pressure sensor 30 measures a rail pressure to obtain a second rail pressure in step 94. The pressure monitoring module 48 determines an actual pressure drop based on the first rail pressure and the second rail pressure in step 96.

The flow rate determination module 50 determines whether the absolute value of the difference between the actual pressure drop and a reference pressure drop exceeds a threshold percentage of the reference pressure drop in step 98. If the absolute value of the difference exceeds the threshold percentage, correction is necessary. The flow rate determination module 50 determines the actual fuel quantity and a correction factor based on the actual fuel quantity, the reference fuel quantity and duration of the fuel injection in step 100. If the actual pressure drop is greater than the reference pressure drop in step 102, the adjusted flow rate is the sum of the reference flow rate and the correction factor in step 106. If the actual pressure drop is less than the reference pressure drop in step 102, the adjusted flow rate is equal to the reference flow rate minus the correction factor in step 104. If not all injectors have undergone the learning process in step 108, the method 80 returns to step 84 to determine the flow rate of the next or remaining injector(s) if the enabling conditions are still present. Otherwise, the method 80 ends in step 110.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. An adaptive fuel delivery control system comprising:
a fuel pump control module that commands a fuel pump to supply no fuel to a fuel rail for a period, wherein the fuel pump is driven by a camshaft of an engine;
a pressure monitoring module that, during the period, measures a change in pressure in the fuel rail over a fuel injection period; and
a flow rate determination module that determines a correction factor based on the measured change in fuel rail pressure, and that determines an adjusted fuel injection period based on the correction factor.

2. The adaptive fuel delivery control system of claim 1 wherein the flow rate determination module determines a mass of fuel injected by a fuel injector based on the measured change in fuel rail pressure.

3. The adaptive fuel delivery control system of claim 2 wherein the flow rate determination module uses a lookup table to determine an expected mass of fuel based on the fuel injection period and a fuel rail pressure before the fuel injection period.

4. The adaptive fuel delivery control system of claim 3 wherein the flow rate determination module determines the correction factor based on the determined fuel mass and the expected fuel mass.

5. The adaptive fuel delivery control system of claim 4 wherein the correction factor increases fuel injection when the determined fuel mass is less than the expected fuel mass or decreases fuel injection when the determined fuel mass is greater than the expected fuel mass.

6. The adaptive fuel delivery control system of claim 5 wherein the adjusted fuel injection period is based on a product of the correction factor and the fuel injection period.

7. The adaptive fuel delivery control system of claim 5 wherein the adjusted fuel injection period is based on a sum of the correction factor and the fuel injection period.

8. The adaptive fuel delivery control system of claim 1 wherein the pressure monitoring module measures the change in fuel rail pressure based on a difference between a first fuel rail pressure and a second fuel rail pressure, wherein the first fuel rail pressure is measured at a start of the fuel injection period and the second fuel rail pressure is measured at an end of the fuel injection period.

9. The adaptive fuel delivery control system of claim 1 further comprising an engine condition evaluation module that activates the flow rate determination module when enabling conditions are met, wherein the enabling conditions are determined based on fuel demand, engine speeds and fuel rail pressure.

10. The adaptive fuel delivery control system of claim 9 further comprising a fuel pump control module that commands the fuel pump to supply no fuel to the fuel rail when the enabling conditions are met.

11. A method of adaptively controlling fuel delivery comprising:
commanding a fuel pump to supply no fuel to a fuel rail for a period, wherein the fuel pump is driven by a camshaft of an engine;
during the period, measuring a change in pressure in the fuel rail over a fuel injection period;
determining a correction factor based on the measured change in fuel rail pressure; and
determining an adjusted fuel injection period based on the correction factor.

12. The method of claim 11 further comprising determining a mass of fuel injected by a fuel injector based on the measured change in fuel rail pressure.

13. The method of claim 12 further comprising using a lookup table to determine an expected mass of fuel based on a fuel rail pressure before the fuel injection period and the fuel injection period.

14. The method of claim 13 further comprising determining the correction factor based on the determined fuel mass and the expected fuel mass.

15. The method of claim 13 further comprising applying the correction factor to increase fuel injection when the determined fuel mass is less than the expected fuel mass or to decrease fuel injection when the determined fuel mass is greater than the expected fuel mass.

16. The method of claim 15 wherein the adjusted fuel injection period is determined based on a product of the correction factor and the fuel injection period.

17. The method of claim 15 wherein the adjusted fuel injection period is determined based on a sum of the correction factor and the fuel injection period.

18. The method of claim 11 further comprising:
measuring a first fuel rail pressure at a start of the fuel injection period;

measuring a second fuel rail pressure at an end of the fuel injection period; and determining the measured change in fuel rail pressure based on a difference between the first and second measured fuel rail pressures.

19. The method of claim 11 further comprising commanding the fuel pump to supply no fuel to the fuel rail when enabling conditions are met, wherein the enabling conditions are determined based on fuel demand, engine speeds and fuel rail pressure.

20. A method for controlling fuel injection in an engine, comprising:

measuring a first pressure of fuel in a fuel rail;

commanding a fuel pump to supply no fuel to the fuel rail for a period, wherein the fuel pump is driven by a camshaft of an engine;

actuating a fuel injector to inject fuel into the engine for a fuel injection period, wherein the fuel rail supplies the fuel to the fuel injector;

after the fuel injection period, measuring a second pressure of fuel in the fuel rail;

determining an amount of fuel injected by the fuel injector during the fuel injection period based on the first and second measured pressures;

determining a correction factor based on the amount of fuel injected by the fuel injector and a desired amount of fuel, wherein the desired amount of fuel is based on the fuel injection period;

after the period, commanding the fuel pump to supply fuel to the fuel rail; and actuating the fuel injector to inject fuel into the engine for a corrected injection period, wherein the corrected injection period is based on the fuel injection period and the correction factor.

\* \* \* \* \*